(12) United States Patent
Aasgaard (10) Patent No.: US 6,796,759 B2
(45) Date of Patent: Sep. 28, 2004

(54) SELF-POLISHING AND TAPPING RIVET ASSEMBLY

(75) Inventor: A. L. Pepper Aasgaard, Omaha, NE (US)

(73) Assignee: A. L. Pepper Aasgaard, III, Omaha, NE (US)

( * ) Notice: Subject to any disclaimer, the term of this patent is extended or adjusted under 35 U.S.C. 154(b) by 0 days.

(21) Appl. No.: 10/050,084

(22) Filed: Jan. 14, 2002

(65) Prior Publication Data
US 2002/0127080 A1 Sep. 12, 2002

Related U.S. Application Data
(60) Provisional application No. 60/261,650, filed on Jan. 12, 2001.

(51) Int. Cl.[7] .................................................. F16B 13/04
(52) U.S. Cl. .......................... 411/29; 411/43; 411/387.2; 408/224
(58) Field of Search ....................... 411/29, 387.1–387.8, 411/43, 34; 408/224, 225, 230

(56) References Cited

U.S. PATENT DOCUMENTS

| | | | |
|---|---|---|---|
| 1,121,076 A | | 12/1914 | Dillon |
| 1,330,689 A | | 2/1920 | Drew |
| 1,342,201 A | * | 6/1920 | Beckwith |
| 2,897,696 A | * | 8/1959 | Tisserant ..................... 408/225 |
| 3,451,303 A | | 6/1969 | Biermann ....................... 85/77 |
| 3,564,945 A | * | 2/1971 | Bradley |
| 3,750,518 A | | 8/1973 | Rayburn ........................ 85/68 |
| 3,836,278 A | * | 9/1974 | McInnes |
| 3,933,075 A | * | 1/1976 | Peterson |
| 3,935,786 A | | 2/1976 | Murray et al. ................. 85/68 |
| 4,085,337 A | | 4/1978 | Moeller ....................... 307/115 |
| 4,211,145 A | | 7/1980 | Dolch .......................... 85/72 |
| 4,218,953 A | | 8/1980 | Haytayan ....................... 85/68 |
| 4,246,828 A | | 1/1981 | Tamashiro .................... 411/45 |
| 4,377,361 A | | 3/1983 | Frieberg ...................... 411/161 |
| 4,388,031 A | | 6/1983 | Rodgers ....................... 411/43 |
| 4,408,938 A | | 10/1983 | Maguire ....................... 411/71 |
| 4,436,467 A | | 3/1984 | Larsson et al. ................ 411/34 |
| 4,580,936 A | | 4/1986 | Francis et al. ................ 411/38 |

(List continued on next page.)

FOREIGN PATENT DOCUMENTS

| | | | | |
|---|---|---|---|---|
| CH | 671617 A | * | 9/1989 | .................. 411/29 |
| DE | 2106107 | * | 8/1971 | .................. 411/29 |
| EP | 77858 | | 5/1983 | ............. F16B/5/02 |
| GB | 25535 | | 12/1898 | |
| GB | 2147385 | | 5/1985 | ........... F16B/19/10 |
| IT | 705797 | | 5/1966 | |

Primary Examiner—Flemming Saether
(74) Attorney, Agent, or Firm—Suiter West PC LLO (57) ABSTRACT

A blind setting rivet assembly capable of permanently fastening one or more sheet metal work pieces or the like together is disclosed. The rivet assembly may be self polishing and self tapping and may also provide a hollow cylindrical threaded bolt head onto which a nut may be affixed to provide a means to removably attach other work pieces, components or the like. The rivet assembly comprises a rivet body having a hollow tubular sleeve and an enlarged flattened head. The rivet body surrounds a mandrel that may have a weakened area of reduced diameter to allow detachment of the mandrel shaft following application of sufficient axial force to the shank. This application of force sets the rivet by causing a tapered shoulder section of the mandrel to deform the rivet sleeve. The mandrel shank may be terminated in a screw tip. This screw tip punctures, spreads, self-taps, and self-polishes an aperture in the work pieces through which the rivet sleeve passes. The mandrel's shank may have a weakened area of reduced diameter adjacent to the screw tip that allows detachment of shaft following application of sufficient axial force to the shank. This application of force causes the tapered shoulder section of the screw tip to compress and deform the rivet sleeve setting the rivet.

38 Claims, 9 Drawing Sheets

U.S. PATENT DOCUMENTS

| | | | | |
|---|---|---|---|---|
| 4,582,458 A | * | 4/1986 | Korb | 408/224 |
| 4,920,833 A | | 5/1990 | Rosenthal | 87/124.1 |
| 4,988,247 A | | 1/1991 | Summerlin | 411/38 |
| 4,990,042 A | | 2/1991 | Szayer et al. | 411/29 |
| 4,998,853 A | | 3/1991 | Shinjo | 411/29 |
| 5,178,501 A | | 1/1993 | Carstairs | 411/55 |
| 5,183,357 A | | 2/1993 | Palm | 411/29 |
| 5,213,459 A | | 5/1993 | Palm | 411/29 |
| 5,219,252 A | | 6/1993 | Schruff | 411/34 |
| 5,230,137 A | | 7/1993 | Abe | 29/525.1 |
| 5,246,323 A | | 9/1993 | Vernet et al. | 411/29 |
| 5,252,014 A | | 10/1993 | Andrews | 411/43 |
| 5,297,909 A | | 3/1994 | Tsay et al. | 411/29 |
| 5,332,346 A | | 7/1994 | Shinjo | 411/31 |
| 5,344,267 A | | 9/1994 | Stenberg et al. | 411/29 |
| 5,383,753 A | | 1/1995 | Palm | 411/29 |
| 5,466,100 A | * | 11/1995 | Ahluwalia | 408/224 |
| 5,472,303 A | | 12/1995 | Palm et al. | 411/29 |
| 5,741,099 A | | 4/1998 | Aasgaard | 411/29 |
| 5,762,456 A | | 6/1998 | Aasgaard | 411/29 |
| 5,915,901 A | | 6/1999 | Aasgaard | 411/29 |

* cited by examiner

SELF-POLISHING AND TAPPING RIVET ASSEMBLY

CROSS-REFERENCE TO RELATED APPLICATIONS

The present application claims the benefit under 35 U.S.C. §119(e) of U.S. Provisional Application No. 60/261,650, filed Jan. 12, 2001. Said U.S. Provisional Application No. 60/261,650 is herein incorporated by reference in its entirety.

INCORPORATION BY REFERENCE

The following related commonly owned patents are incorporated herein by reference in their entirety:

| Inventor | U.S. Pat. No. | Issue Date | Filing Date |
| --- | --- | --- | --- |
| Aasgaard | 5,741,099 | Apr. 21, 1998 | Jul. 12, 1996 |
| Aasgaard | 5,762,456 | Jun. 9, 1998 | Jul. 12, 1996 |
| Aasgaard | 5,915,901 | Jun. 29, 1999 | Oct. 27, 1997 |

FIELD OF THE INVENTION

The present invention generally relates to the field of fasteners such as rivets and the like, and more particularly to a self-polishing and tapping rivet assembly.

BACKGROUND OF THE INVENTION

Blind setting rivets are typically used to fasten sheet metal work pieces or the like together when access is available to only one side of the work pieces. However, application of blind setting rivets may at times be cumbersome. For example, in many applications, special jigs must be used to maintain exact alignment of the work pieces from the time the hole is drilled until the rivet can be applied.

Because of these and other limitations, self-drilling blind setting rivets were developed. These rivets employ specialized drill heads which may be difficult to manufacture and are thus prohibitively expensive for many applications. Further, such rivets may leave a burr on the outer layer of the work piece materials. This burr may prevent proper seating of the rivet and may cause fractures in work pieces as it is applied, resulting in a weak joint. Known to the art are self-drilling rivets having deburring ears to remove burrs during the drilling operation. However, the drill bit of such rivets removes work piece material to create a hole for the rivet shank. This removed material may fall within an enclosed area creating a possible nuisance or hazard.

Typical drills have spirals designed to help the metal edges cut and spiral the shrapnel out. In a typical self-drilling rivet the spirals are designed to help the cut metal edges to create shrapnel which requires that high torque be placed on the mandrel of the rivet assembly.

U.S. Pat. No. 5,915,901 describes the use of the excurvations formed during application to increase application strength. However, in some applications, a polished aperture is desirable. Consequently, it would be advantageous to provide a blind setting rivet that would be both self-tapping and self-polishing instead of only self drilling (using a drill bit) or only self-tapping (using a screw tip). Such a self-tapping, self-polishing rivet would remove all excurvations that would leave a clean aperture. Additionally, a self-tapping and self-polishing rivet would be less expensive and easier to manufacture than the self-drilling rivets (using a drill bit) and would require less torque during application.

SUMMARY OF THE INVENTION

Accordingly, the present invention is directed to a self-tapping and self-polishing blind setting rivet assembly capable of permanently fastening one or more work pieces or the like together and/or to another object. In one embodiment, the rivet assembly may further include a hollow cylindrical threaded bolt head onto which a nut may be affixed to provide a means to removably attach other work pieces, components or the like.

In exemplary embodiments of the invention, the self-tapping and self-polishing blind setting rivet assembly comprises a rivet body having a hollow tubular sleeve and an enlarged flattened head. The rivet body surrounds a mandrel having a weakened area of reduced diameter to allow detachment of the mandrel shaft following application of sufficient axial force to the shank. This application of force sets the rivet by causing a tapered shoulder section of the mandrel to deform the rivet sleeve. The mandrel shank is terminated in a self-tapping and self-polishing auger that punctures, spreads, self-taps and self-polishes an aperture in the work piece(s) through which the rivet sleeve passes. The self-tapping and self-polishing auger includes a generally longitudinally formed groove providing one or more cutting edges that incrementally shave or carve small amounts of work piece material allowing torque to be dispersed over several small cutting edges simultaneously.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 11, a self-tapping and self-polishing, blind setting rivet assembly 100 in accordance with an exemplary embodiment of the present invention is described. As shown, rivet assembly 100 comprises a rivet body 102 having a hollow tubular rivet sleeve 104 and an enlarged flattened head 106 surrounding a mandrel 108 having a self-tapping and self-polishing auger 110, a shoulder section 112, and a shank 114. In exemplary embodiments, the rivet body 102 may be made of steel, aluminum, plastic, composite, or other desirable rivet material. The mandrel 108 may be made of steel, aluminum, plastic, composite, or other material, which is preferably of higher tensile strength than the rivet body material.

Figure 2:
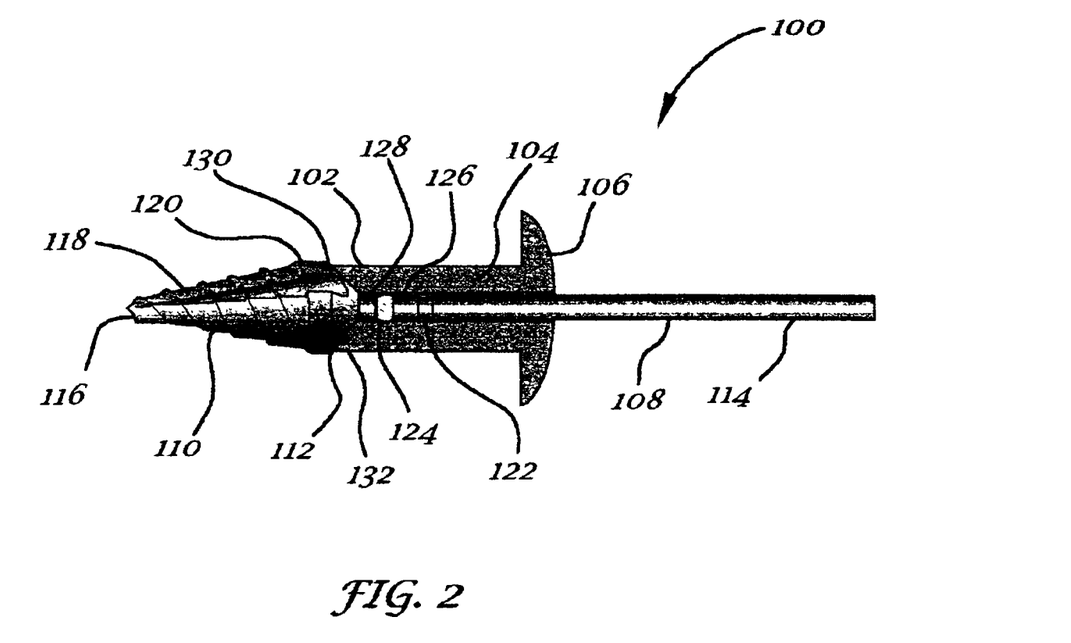
FIG. 2 is a partial cross-sectional side elevational view illustrating the self-tapping and self-polishing blind setting bolt rivet assembly shown in FIG. 1.
Figure 3:
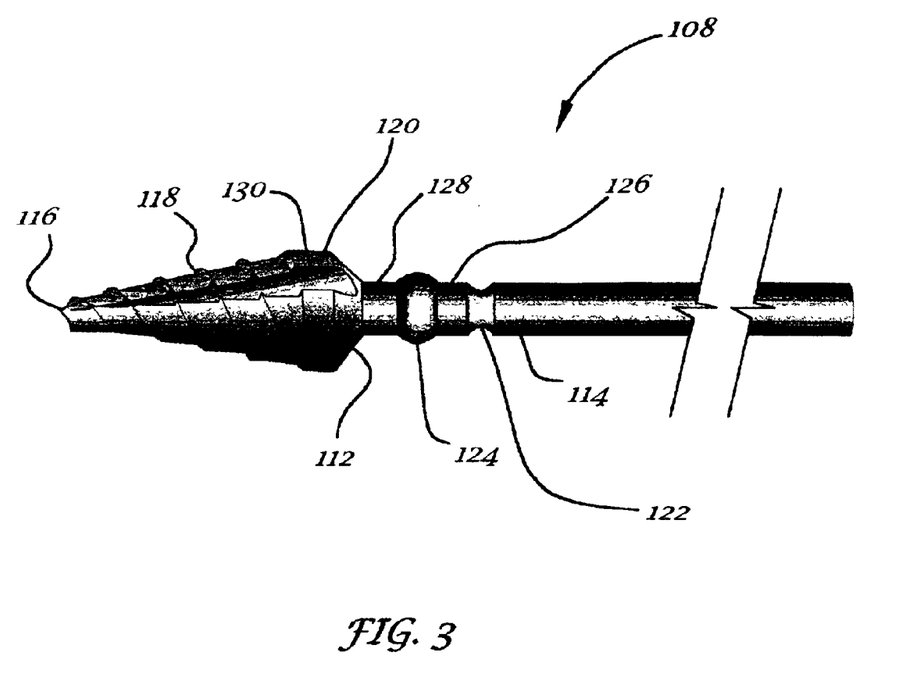
FIG. 3 is a side elevational view illustrating the mandrel of the rivet assembly shown in FIG. 1.

Self-tapping and self-polishing auger 110 is comprised of a generally conical barrel having a self-tapping and self-polishing tip 116, a cutting portion 118, and optionally a polishing portion 120. A weakened area of reduced diameter 122 may be formed in the mandrel shank 114 rearward from shoulder section 112. This weakened area 122 is preferably sized to fracture upon application of a predetermined tensile force to the shank 114 allowing self-tapping and polishing auger 110 and shoulder section 112 to be detached from shank 114 following completed application of the rivet assembly 100. Likewise, an area of enlarged diameter 124 may be formed in mandrel 108 between shoulder section 112 and weakened area of reduced diameter 122. This area of enlarged diameter 124 retains mandrel 108 within rivet body 102 until sufficient force is applied to the shank 114 during application to set the rivet body 102 and cause the area of reduced diameter 122 to fracture. In one embodiment, this enlarged area 124 also retains the self-tapping and polishing auger 110 and shoulder section 112 within sleeve 104 following application of the rivet assembly 100 by creating an interference with the inner surface of the sleeve 104 as the sleeve 104 is deformed during application of the rivet. Moreover, in embodiments of the invention, mandrel 108 may include a grommet or like seal for providing a liquid and gas impermeable seal between the shank 114 and the rivet body 102. As shown in FIGS. 2 and 3, lengths or spaces 126 & 128 of mandrel 108 may be provided between shoulder section 112 and enlarged portion 124 and between enlarged portion 124 and weakened area 122. However, in some applications these spaces 126 & 128 may be eliminated.

In embodiments of the invention, weakened area 122 may be positioned on mandrel 108 so that a length of shank 114 remains in rivet body 102 after separation of the rear portion of the shank 114. Preferably, this length is predetermined to allow shank 114 to fracture at a point that is substantially flush with the outer surface of enlarged flattened head 106. In this manner, the remaining part of shank 114 substantially fills the hollow portion of the rivet body 102, increasing its strength.

It will be appreciated that the areas of reduced diameter 122 and enlarged diameter 124 may have different cross-sectional shapes depending upon factors such as, for example, the material from which the mandrel 108 is made, the types of work piece material(s) in which the rivet assembly 100 is being applied, the amount of fracture strength required for the area of reduced diameter 122, and the holding strength of the area of enlarged diameter 124. For instance, in FIGS. 2 and 3, the area of reduced diameter 122 and enlarged diameter 124 are shown as having generally curved cross-sectional shapes. However, in other embodiments, these areas may have a V-shape, a rectangular shape, a faceted shape, or the like.

During application of rivet assembly 100, self-tapping and polishing auger 110 is held substantially normal to the surface of a work piece while rotary motion is applied to shank 114. This rotary motion threads the auger 110 into the work piece materials and expands them. In this manner, the auger 110 pulls itself through the work piece materials while simultaneously smoothing the aperture it forms. Preferably, self-tapping and self-polishing tip 116 is pointed or angled to facilitate piercing of the outer surface of the work piece.

In exemplary embodiments, the rear portion of the shank 114 may be designed for use with a specialized chuck or various types of power or hand tools to provide rotary motion and axial retraction to the mandrel 108. Preferably, the outer diameter 130 of shoulder section 112 is slightly larger than outer diameter 132 of rivet sleeve 104 allowing the sleeve to pass through the hole or aperture formed by self-tapping and self-polishing rivet head 110.

Figures 4, 5A, 5B:
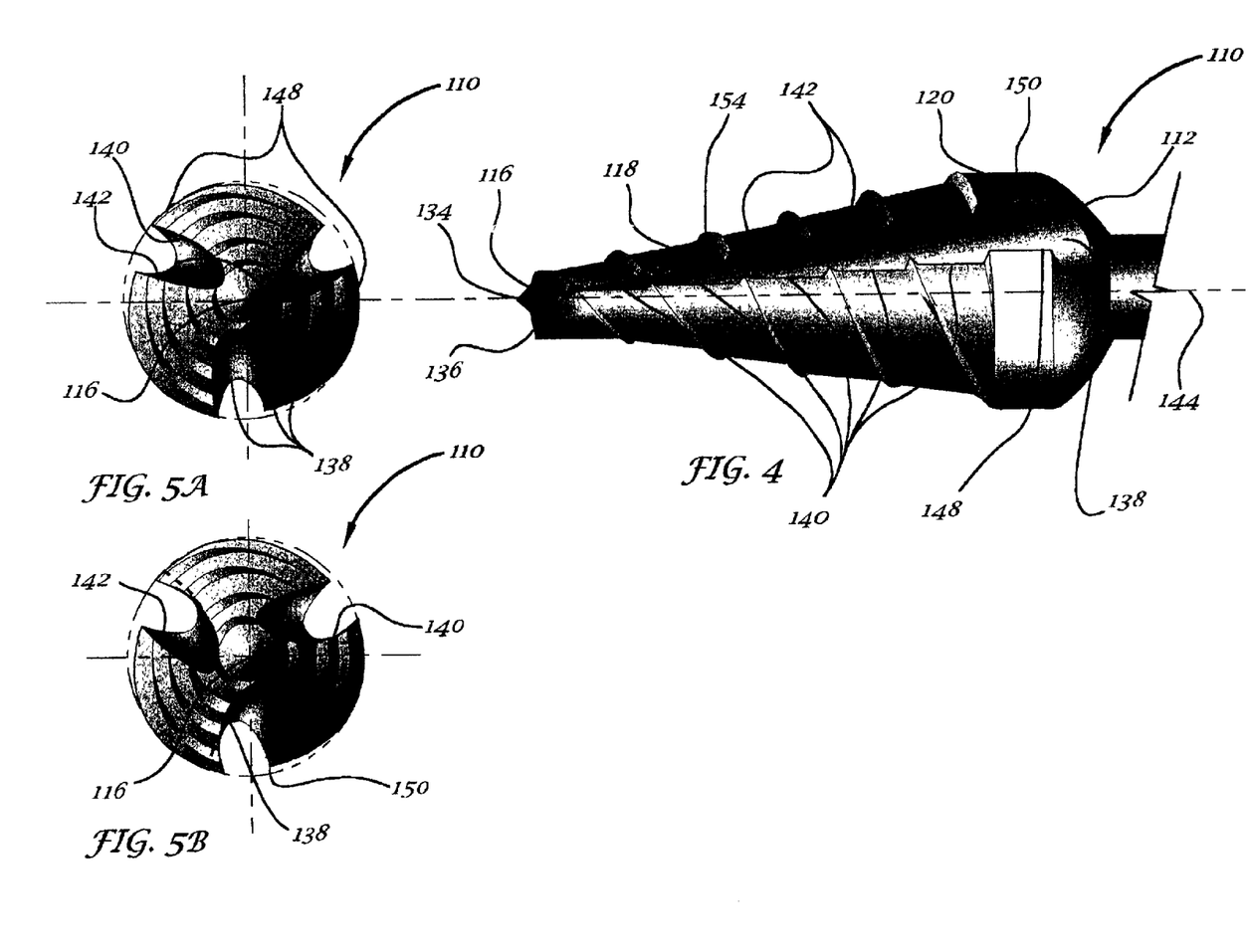
FIG. 4 is a side elevational enlarged view illustrating the self-tapping and self-polishing head of the mandrel shown in FIG. 3.
FIGS. 5A and 5B are a front elevational views further illustrating exemplary self-tapping and self-polishing augers in accordance with the present invention.

Referring now to FIG. 4, the self-tapping and self-polishing auger 110 of mandrel 108 is described. As described in the discussion of FIGS. 1 through 3, self-tapping and self-polishing auger 110 is comprised of a generally conical barrel having a self-tapping tip 116, a cutting portion 118, and optionally a polishing portion 120. In the embodiment illustrated, self-tapping tip 116 includes a point 134 for piercing the surface of a work piece. Point 134, which may be centered on the longitudinal axis of auger 110 or offset therefrom, extends into one or initial contact edges 136 suitable for forming a hole or aperture by puncturing, separating and then scraping or carving work piece material. Initial contact edges 136 may be angled and may be offset to assist in separating and tapping the work piece material(s). In this manner, self-tapping and self-polishing tip 116 facilitates initial insertion (tapping) of the rivet assembly 100 allowing the rivet assembly 100 to be more easily started in the work piece.

As shown in FIG. 4, a groove 138 is formed generally longitudinally in the cutting portion 118 of auger 110. Groove 138 may extend to various depths in auger 110 and may have a variety of shapes depending on factors such as, for example, the material of the work piece for which the rivet assembly 100 (FIG. 1) is to be used (e.g., steel, aluminum, plastic, etc). For example, as shown in FIGS. 4 and 5, groove 138 may have a generally half-conical shape extending from self-tapping and polishing tip 116 to shoulder section 112 so that the depth of groove 138 increases uniformly through cutting portion 118. However, it will be appreciated that groove 138 is not limited to this shape, but may have other shapes depending the materials of the work pieces in which the rivet assembly 100 (FIG. 1) is being inserted, and the like. For example, in one embodiment, groove 138 may extend only partially from shoulder portion 112 of auger 110 to tip 116 while in another embodiment groove 138 may have a constant depth between tip 116 and shoulder portion 112 or may vary in depth or width in a non-uniform manner.

Staged leading cutting edges 140 and trailing edges 142 may be formed in the cutting portion 118 of self-tapping and self-polishing auger 110 along groove 138, rearward of self-tapping tip 116. Preferably, leading cutting edges 140 incrementally remove work piece material(s) by shaving or carving the materials from the wall of the aperture being formed. The removed materials may then be channeled away from the aperture by groove 138. In this manner, the amount of torque required for inserting or tapping rivet assembly 100 through a work piece is substantially reduced compared to conventional self-boring rivet assemblies.

In the exemplary embodiment shown, leading cutting edges 140 and trailing edges 142 may be substantially parallel to the longitudinal axis 144 of self-tapping and self-polishing auger 110. Alternately, as shown FIG. 6A, any or all of leading cutting edges 140 and trailing edges 142 may be angled, thereby forming an angle (α) with respect to longitudinal axis 144. As shown in FIG. 4, leading cutting edges 140 and trailing edges 142 are generally parallel to longitudinal axis 144, angle (α) is substantially zero (0). Further, either or both of leading cutting edges 140 and/or trailing edges 142 may be curved.

A polishing leading edge 148 may be formed in the polishing portion 120 of self-tapping and self-polishing auger 110 along groove 138 rearward of cutting portion 118 and forward of shoulder portion 112. Similarly, a polishing trailing edge 150 may be formed in the polishing portion 120 along groove 138 opposite leading edge 148. Preferably, polishing leading and trailing edges 148 & 150 remove any excurvations (e.g., material bored away from work piece by auger 110) leaving a clean, substantially burr free aperture formed in the work piece(s) through which rivet sleeve 104 (FIGS. 1 and 2) may pass. Further, either or both of polishing leading edge 148 and/or polishing trailing edge 150 may be curved.

Figure 6A:
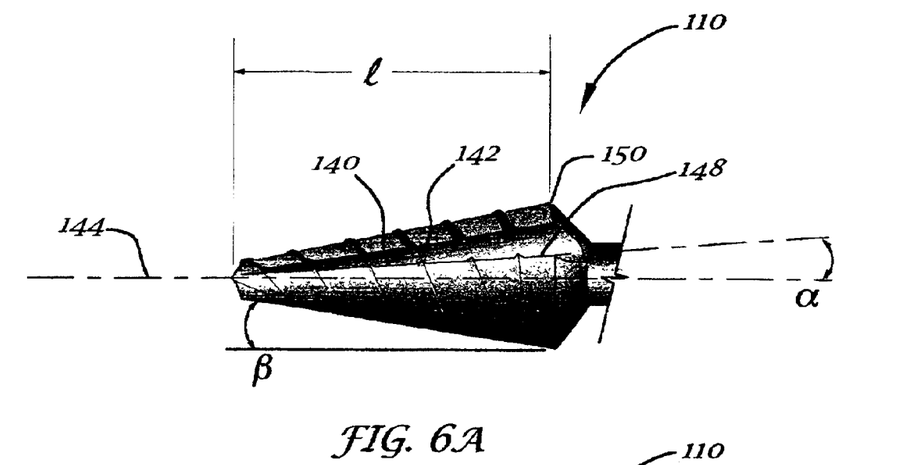
FIGS. 6A, 6B and 6C are side elevational view illustrating alternative self-tapping and self-polishing augers in accordance with exemplary embodiments of the invention.

In the exemplary embodiment shown, polishing leading edge 148 and polishing trailing edge 150 may be substantially parallel to the longitudinal axis 144 of auger 110. Alternatively, as shown in FIG. 6A, either one or both of polishing leading edge 148 and polishing trailing edge 150 may be angled, thereby forming an angle (β) with respect to longitudinal axis 144.

By angling cutting edges 140, trailing edges 142, polishing leading edge 148 and/or polishing trailing edge 150, the amount of material removed during each turn of auger 110 may be controlled. Generally, by selecting a larger value of angle (α) for an auger having a given length (l), a smaller amount of work piece material is removed by each leading cutting edge 140. Likewise, by selecting a larger value of angle (β) for an auger 110 having a given length (l), a smaller amount work piece material is removed during each turn. Thus, it will be appreciated that the selection of angles (α) and (β) will depend on factors such as the application in which rivet assembly 100 is to be used and the material properties of the work pieces in which rivet assembly 100 is to be inserted, the amount of material to be removed by cutting and polishing edges 140 & 148, and the like. For example, in the embodiment shown in FIG. 4, wherein polishing edges 148 and polishing trailing edge 150 are generally parallel to longitudinal axis 144, angle (β) is substantially zero (0). Conversely, in the embodiment shown in FIG. 6A, polishing edges 148 & 150 are formed with an angle (β) equal to the taper of the cutting portion 118 of self-tapping and self-polishing auger 110. According, the polishing edges 148 & 150 shown in FIG. 4 would remove more material from the work piece(s) during each turn of auger 110 than the polishing edges shown in FIG. 6A.

Referring now to FIGS. 5A and 5B, self-tapping and self-polishing auger 110 may include multiple grooves 138 and thus multiple sets of leading cutting edges 140 and trailing edges 142 spaced about its circumference. Moreover, leading cutting edge 140 may extend outwardly from longitudinal axis 144 (FIG. 4) further than trailing edge 142 depending on the application in which rivet assembly 100 is to be used, the material properties of the work pieces in which rivet assembly 100 is to be inserted, and the like. Similarly, polishing leading edge 148 may extend outwardly from longitudinal axis 144 (FIG. 4) further than polishing trailing edge 150. FIG. 5B illustrates an auger 110 wherein grooves 138 are angled with respect to the longitudinal axis 144 (FIG. 4) of the auger 110, while FIG. 5A illustrates an auger 110 wherein the grooves 138 are substantially straight (not angled).

Figure 1:
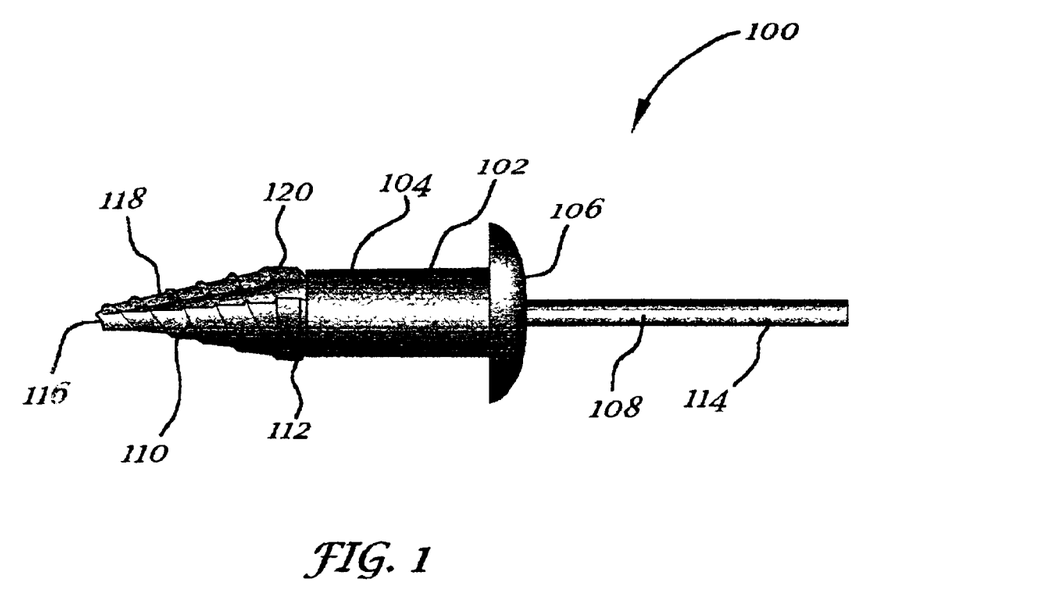
FIG. 1 is a side elevational view illustrating a self-tapping and self-polishing blind setting rivet assembly in accordance with an exemplary embodiment of the present invention.

Turning again to FIG. 4, threads 154 may extend substantially about the barrel of self-tapping and self-polishing auger 110. Threads 154 may extend between each leading cutting edge 140 and trailing edge 142 along the length of cutting portion 118, thus, separating each leading cutting edge 140 and trailing edge 142 from longitudinally adjacent leading cutting edges or trailing edges. Preferably, as auger 110 is inserted into a work piece, threads 154 pull the head through the work piece material, reducing the amount of force required to drive the head through the work piece. Shoulder section 112 may have a convex surface for providing less resistance to rivet sleeve 104 (FIG. 1).

In exemplary embodiment of the invention, polishing portion 120 may be tapered. Threads 154 may blend smoothly into polishing portion 120 or, alternately, shoulder section 112 to provide a smooth transition for polishing of the aperture formed. FIGS. 4, 5A, and 5B illustrate threads 154 as having a generally helical cone shape and extending between tip 116 and polishing portion 120. However, it will be appreciated that those of skill may employ other thread designs in the art without departing from the scope and spirit of the present invention. For example, the size and pitch of threads 154 may be varied, or the width or spacing of threads 154 may be increased or decreased as they progress along cutting portion 118 away from tip 116.

Figure 6B:
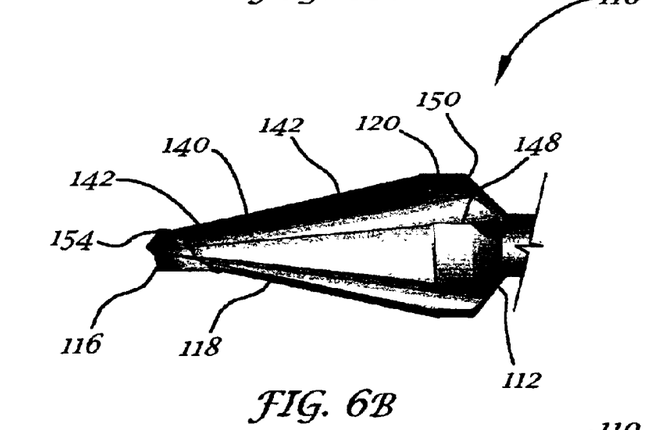
Figure 6C:
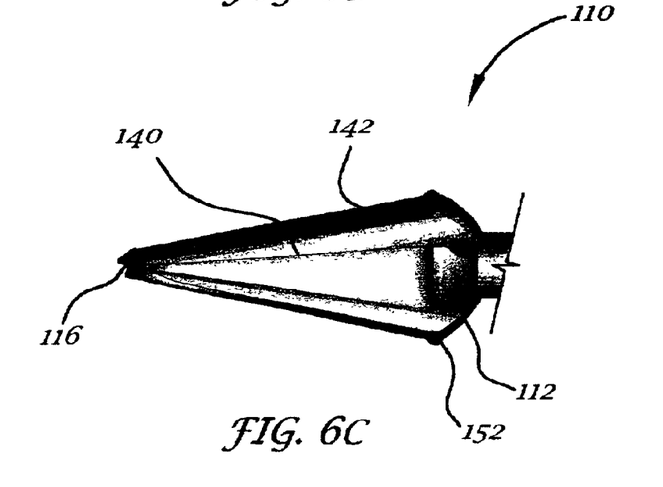

In embodiments of the invention shown in FIGS. 6B and 6C, threads 154 may extend only partially along the length of the barrel of auger 110 from tip 116 to polishing portion 120 (as shown in FIG. 6B), or may be eliminated entirely (as shown in FIG. 6C) so that single leading cutting edges 140 and trailing edges 142 are formed. In FIG. 6C, polishing edges 148 & 150 (FIG. 4) are also eliminated so that leading cutting edges 140 and trailing edges 142 extend the length of auger 110 from tip 116 to shoulder portion 112. As shown in FIG. 6C, auger 110 may optionally include protruding finishing edges 152 which, in softer metals such as aluminum and the like, will function to remove any burr created by leading cutting edges 140 as the aperture in the work piece is formed.

Figure 7:
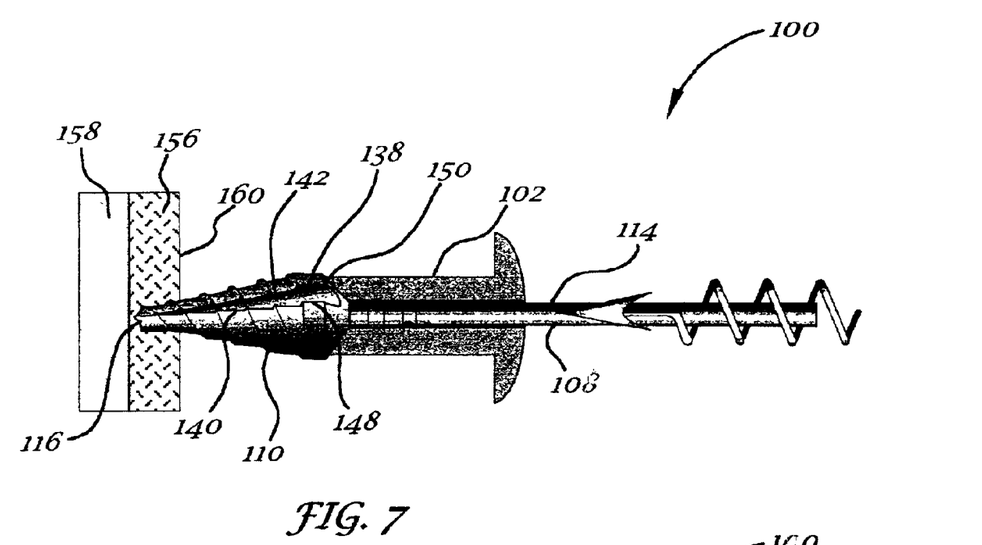
FIG. 7 is a partial cross-sectional side elevational view of the rivet assembly shown in FIG. 1 depicting the rivet assembly at the beginning of application.

FIGS. 7 through 11 illustrate the application or insertion of a self-tapping and self polishing rivet assembly 10, described in connection with FIGS. 1 through 5, to join two or more work pieces (two work pieces 156 & 158 are shown). FIG. 7 depicts the rivet assembly 100 near the beginning of application. Preferably, the self-tapping and self polishing auger 110 is held substantially normal to the outer work piece surface 160 while rotary motion is applied to the shank 114 of mandrel 108. For instance, as described in the discussion of FIG. 1, the rear portion of the shank 114 may be placed in a specialized chuck (not shown) and various types of power or hand tools (not shown) may be used to provide rotary motion and axial retraction to the mandrel 108 (see FIGS. 9, 10 and 11).

Rotary motion applied to mandrel 108 causes self-tapping tip 116 to tap a hole or aperture in adjacent work pieces 156 & 158. As the self-tapping tip 116 punctures, spreads and cuts the work piece materials, removed material on the inner surface 160 of the innermost work piece 152 is separated and scraped or carved away from the work piece. The rotary motion further drives threads 154 of head 110 into the work pieces 156 & 158, pulling the auger 110 though the work pieces where cutting edges 140 & 142 incrementally shave or carve material from the surface of the aperture being formed. This removed material may then be channeled away from the aperture via groove 138. In this manner, the amount of torque required to insert or tap auger 110 through a work piece is substantially reduced compared to that required by augers of conventional self-boring rivet assemblies. Further, the material removed by auger 110 may be more easily removed since it is channeled to the outer surface 160 of work piece 156.

Figure 8:
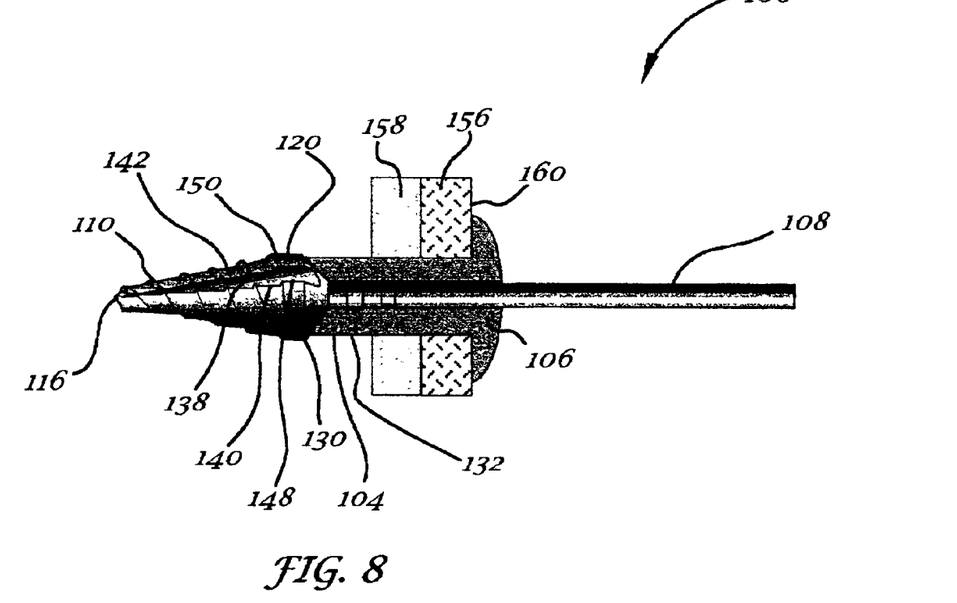
FIG. 8 is a partial cross-sectional side elevational view of the rivet assembly shown in FIG. 1 depicting the rivet assembly following the separation and folding of an aperture through the work piece materials by the screw tip.

FIG. 8 illustrates rivet assembly 100 following the creation of an aperture through the work piece materials (156 & 158) by the self-tapping and self-polishing auger 110. As polishing portion 120 of auger 110 passes though the aperture formed in work pieces 156 & 158, the rotary motion applied to shank 114 further causes polishing edges 148 & 152 to shave or carve additional material, burrs caused by leading cutting edges 140 and the like from the inner surface of the aperture, smoothing the aperture prior to insertion of rivet sleeve 104. Preferably, the outer diameter 130 of the shoulder section 112 is slightly larger than outer diameter 132 of rivet sleeve 104 allowing the sleeve to pass through the aperture formed. Once the aperture is formed in work pieces 156 & 158, rivet sleeve 104 may be inserted into the aperture until enlarged flattened head 106 abuts the outer surface 160 of the outer work piece 156.

Figure 9:
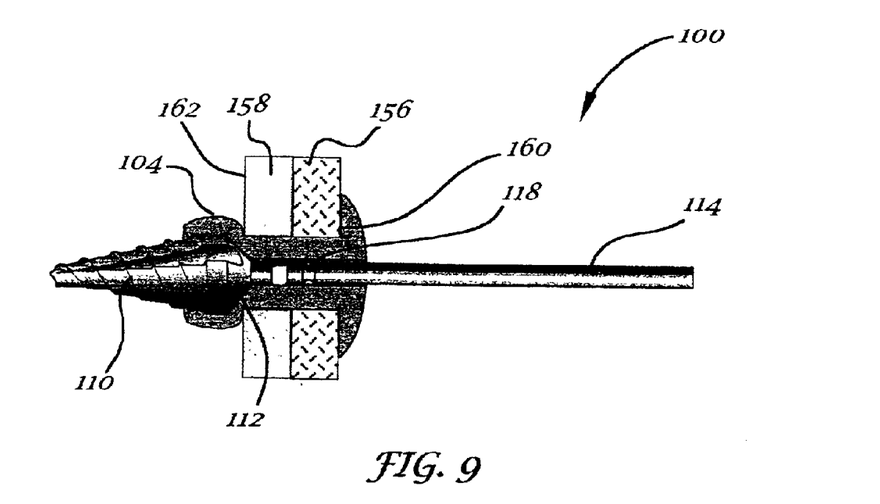
FIG. 9 is a partial cross-sectional side elevational view of the rivet assembly shown in FIG. 1 depicting the rivet assembly after the application of a rearward force on the mandrel shank.

FIG. 9 depicts rivet assembly 100 following the application of a rearward tension force on shank 114 setting the rivet assembly 100. To set the rivet assembly 100, the rear portion of the shank 114 may be grasped by a riveting tool, a grasping tool, or the like, and axially retracted away from the outer surface 160 of work piece 156. This axial retraction causes shoulder section 112 to deform rivet sleeve 114. As shoulder section 112 (and self-tapping and self-polishing head 110) is drawn into rivet sleeve 104, the tapered upper face of shoulder section 112 spreads the sleeve 104 radially. This action causes the rivet sleeve 104 to be spread until it will no longer pass through the aperture created in the work pieces 156 & 158. Further, the deformed portion of rivet sleeve 104 is pulled against the inner surface 162 of the innermost work piece 154 tightening the rivet to the work pieces 152 & 154. Preferably, the weakened area of reduced diameter 118 is sized to break at a predetermined tensile load greater than the tensile load required to cause deformation of hollow tubular sleeve 104, allowing the sleeve 104 to be fully deformed prior to separation of shank 114.

Figure 10:
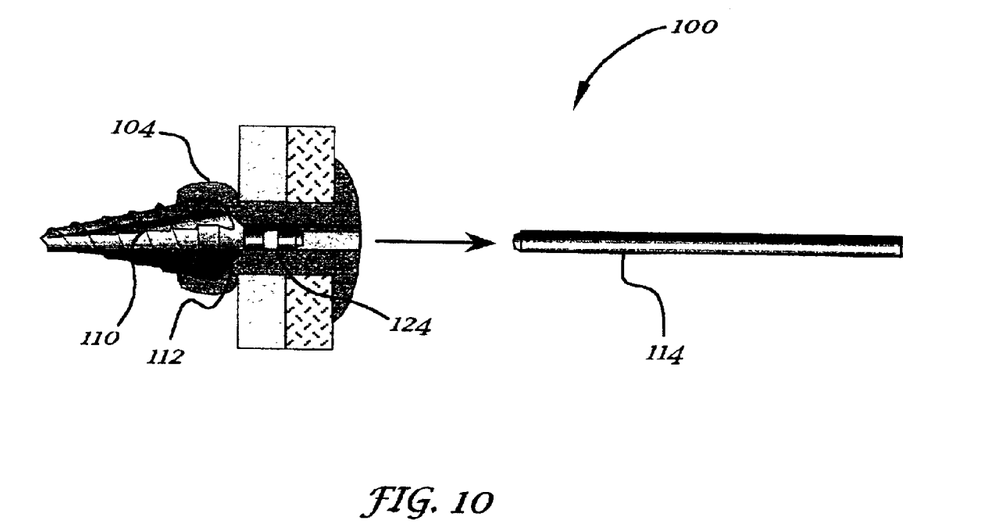
FIG. 10 is a partial cross-sectional side elevational view of the rivet assembly shown in FIG. 1 illustrating separation of the upper shank from the screw tip and shoulder section.

FIG. 10 depicts rivet assembly 100 following separation of shank 114 and setting. In the embodiment shown, self-tapping and self-polishing auger 110 and shoulder section 112 are retained in rivet sleeve due to an interference between enlarged area 124 and the inner surface of the sleeve 104. This interference may be created by deformation of the rivet sleeve 104 during application. In embodiments of the invention, the tapered upper face of shoulder section 112 may further deform the rivet sleeve 104 to at least partially encircle the head 110 to provide additional retention of the head 110 after application of the rivet assembly 100.

Figure 11:
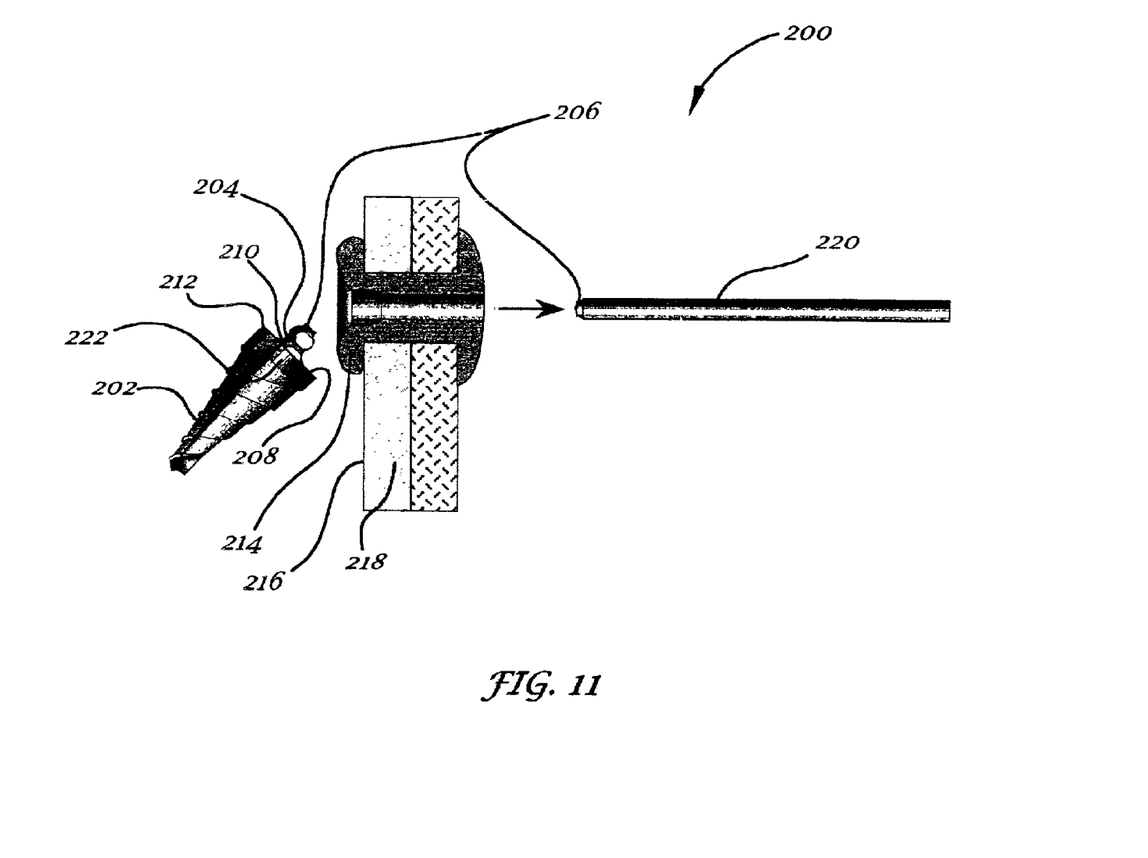
FIG. 11 is a partial cross-sectional side elevational view of an alternative embodiment of the present invention depicting the detachment of the auger and shoulder section following application.

FIG. 11 illustrates a rivet assembly 200 in accordance with an alternative embodiment of the present invention wherein the self-tapping and self-polishing head and shoulder section detach from the rivet body following application of the rivet assembly. In such embodiments, wherein self-tapping and self-polishing auger 202 is allowed to drop off, the shoulder section 204 of mandrel 206 may have a face 208 comprising a tapered inner section 210 and a flat-plate outer section 212. Preferably, the tapered inner section 210 initially spreads the lower end of rivet sleeve 214. The flat-plate outer section 212 then flattens the sleeve 214 against the inner surface 216 of the innermost work piece 218 allowing the self-tapping and self-polishing head 202 and shoulder section 204 to drop off following separation of shank 220. Shoulder section 204 may further include etchings or serrations 222 about its perimeter for smoothing and polishing the aperture formed by auger 202.

Figure 12:
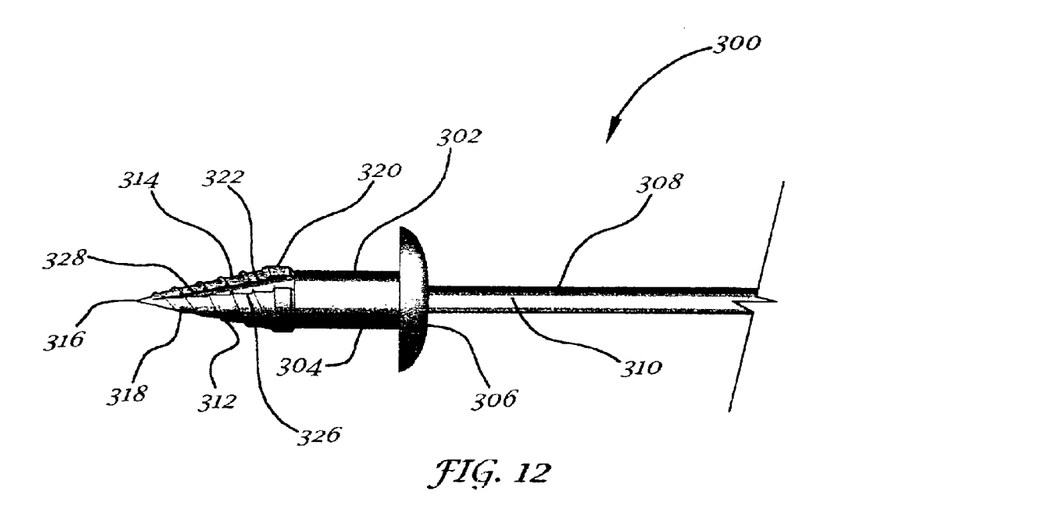
FIG. 12 is a partial cross-sectional, side elevational view illustrating a self-tapping and self-polishing blind setting rivet assembly in accordance with a second exemplary embodiment of the present invention.
Figure 13:
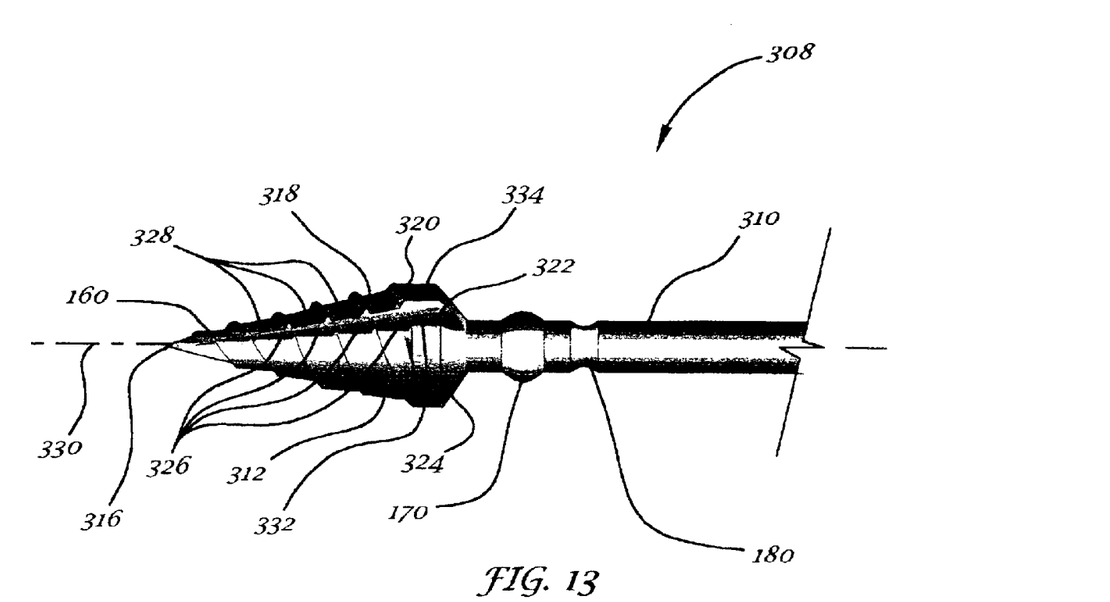
FIG. 13 is a side elevational view illustrating the mandrel of the rivet assembly shown in FIG. 12.

Referring now to FIGS. 12 and 13, a rivet assembly 300 employing a self-tapping and self-polishing head in accordance with a second exemplary embodiment of the present invention is described. Rivet assembly 300 comprises a rivet body 302 having a hollow tubular rivet sleeve 304 and an enlarged flattened head 306 surrounding a mandrel 308 having a shank 310 having a self-tapping and self-polishing auger 312. The self-tapping and self-polishing auger 312 is comprised of a generally conical threaded barrel 314 having a self-tapping tip 316, a cutting portion 318, and optionally a polishing portion 320. In the embodiment illustrated, self-tapping tip 316 is pointed (i.e., it does not include initial contact edge 136 (FIG. 4)) or has an initial contact edge 136 of nominal size) for forming or tapping an aperture in work piece by puncturing and separating work piece materials allowing the rivet assembly to be more easily tapped or started in the work piece.

A groove 322 is formed generally longitudinally in the cutting portion 318 of barrel 314. Groove 322 may extend to various depths in barrel 314 and may have different shapes depending on the material of the work piece for which the rivet assembly 300 is designed. For example, as shown, groove 322 may have a generally V-shaped cross-section extending from self-tapping tip 316 to shoulder section 320 wherein the depth of groove 322 increases longitudinally along barrel 314 from tip 316 to shoulder section 324.

Staged leading cutting edges 326 and trailing edges 328 may be formed in the cutting portion 318 of auger 312 along groove 322, rearward of self-tapping tip 316. Like cutting edges 140 & 142 of FIGS. 1 through 5, leading cutting edges 326 incrementally remove work piece material(s), which may then be channeled away by groove 322. In this manner, the amount of torque required to insert rivet assembly 300 through a work piece is substantially reduced compared to conventional self-boring rivet assemblies. Further, like cutting edges 140 of FIGS. 1 through 5B, leading cutting edges 326 and trailing cutting edges 328 may be substantially parallel to the longitudinal axis 330 of auger 312 or may be angled with respect to the longitudinal axis 330 depending on the application in which rivet assembly 300 is to be used, the material properties of the work pieces in which rivet assembly 300 is to be inserted, the amount of material to be removed by each cutting edge 326, and the like.

Similarly, polishing leading edge 332 and trailing edge 334 may be formed in the polishing portion 320 of self-tapping and self-polishing auger 312 along groove 322 rearward of cutting portion 318 and forward of shoulder portion 322. Like polishing edges 148 & 150 of FIGS. 1 through 5B, polishing leading and trailing edges 332 & 334 remove any excurvations (e.g., material bored away from work piece by head 110) leaving a clean, substantially burr free, aperture through the work piece(s) through which rivet sleeve 304 may extend. Further, like polishing edges 148 & 150 of FIGS. 1 through 5, polishing edges 332 & 334 may be substantially parallel to longitudinal axis 330 or may be angled with respect to the longitudinal axis 330 depending on the application in which rivet assembly 300 is to be used, the material properties of the work pieces in which rivet assembly 300 is to be inserted, the amount of material to be removed by each polishing edge 332 & 334, and the like.

Figure 14:
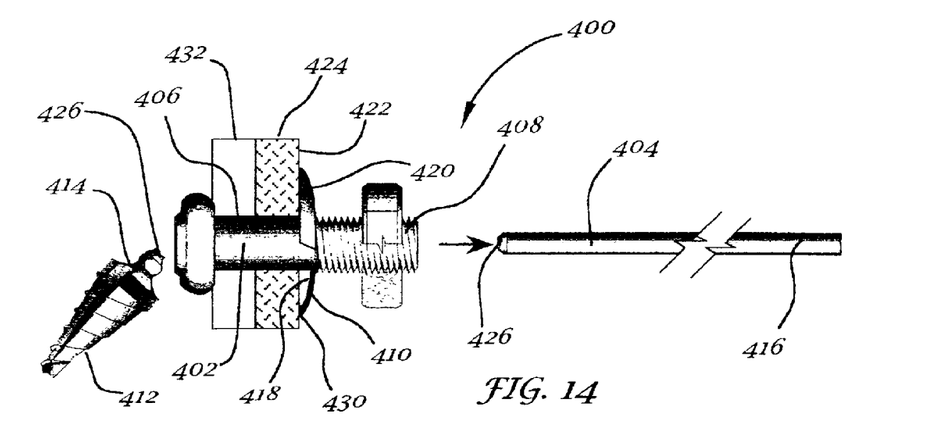
FIG. 14 is a partial cross-sectional side elevational view illustrating a self-tapping and self-polishing blind setting bolt rivet assembly in accordance with an exemplary embodiment of the present invention, wherein the bolt rivet assembly is shown following application of rearward force on the mandrel shank causing separation of the upper shank and the screw tip.
Figure 15:
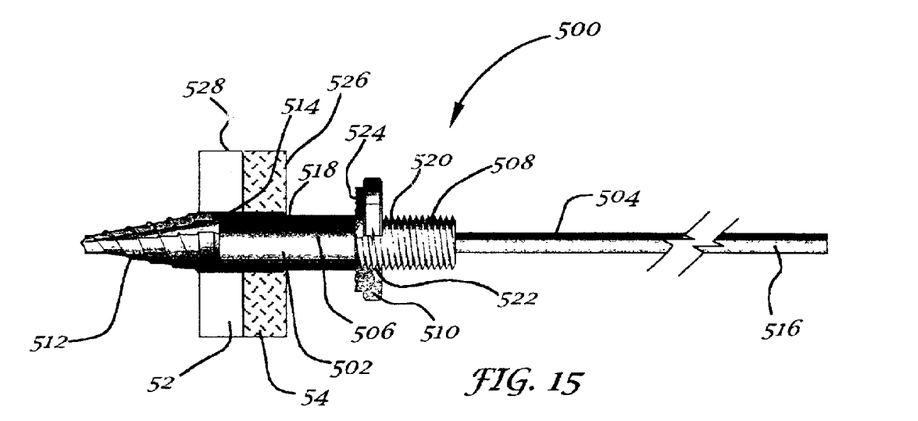
FIG. 15 is a partial cross-sectional side elevational view illustrating a self-tapping and self-polishing blind setting bolt rivet assembly depicting with a threaded enlarged flattened head in accordance with an exemplary embodiment of the present invention, wherein the bolt rivet assembly is shown following completion of self-tapping and self-polishing of an aperture prior to application.
Figure 16:
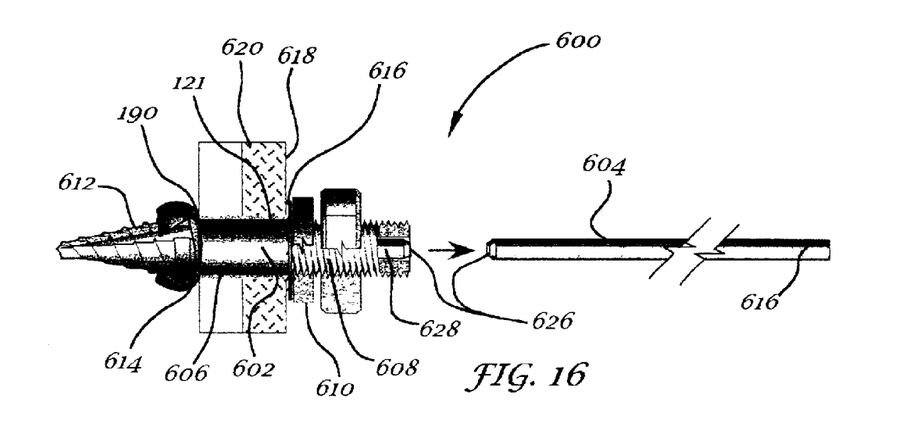
FIG. 16 is a partial cross-sectional side elevational view illustrating a self-tapping and self-polishing blind setting bolt rivet assembly in accordance with an exemplary embodiment of the present invention, wherein the bolt rivet assembly is shown following application.

FIGS. 14 through 16 illustrate bolt rivet assemblies in accordance with exemplary embodiments of the present invention. The bolt rivet assemblies 400, 500 & 600 comprises a hollow rivet body 402, 502 & 602 surrounding a mandrel 404, 504 & 604, respectively. As shown, each of the rivet bodies 402, 502 & 602 includes a hollow tubular sleeve 406, 506 & 606 and a threaded bolt head 408, 508 & 608 separated by an enlarged flattened head or flange 410, 510 & 610. The rivet body 402, 502 & 602 may be made of steel, aluminum, plastic, composite, or other desirable rivet material. The mandrel 404, 504 & 604 may comprise a self-tapping and self-polishing head 412, 512 & 612 (e.g., head 110 shown in FIGS. 4 and 5 or, alternately, head 312 shown in FIGS. 12 and 13), a shoulder section 414 & 514 and a shank 416, 516 & 616. The mandrel 404, 504 & 604 may be made of steel, aluminum, plastic composite, or other material that is preferably of higher tensile strength than the rivet body material.

In certain applications, it may be desirable for the threaded portion of bolt head 408, 508 & 608 to have multiple sets of threads. A separate head may be fashioned so that these multiple threads may strip its internal threads as it is being threaded onto the rivet body. Thus, once threaded onto the threaded portion, the head cannot be removed. In this fashion, the head may be tightened onto the rivet body and permanently retained. A second nut may be fashioned having a thread pattern corresponding to that of the rivet body so that it will not be stripped and consequently may be removable. Nuts suitable for use with bolt rivet assemblies 400, 500 & 600 may vary from six-sided or hex head nuts and wing nuts to various special shapes as required by the application. Additional work pieces, other components, or the like (not shown) may be removably attached to the threaded bolt head and secured by the nut.

FIG. 14 depicts a rivet assembly 400 comprising a rivet body 402 including an enlarged flattened head or flange 410 having a concave inner face 418 and convex outer face 420. Preferably, as the rivet assembly 400 is applied, axial retraction of the mandrel 404 pulls the enlarged flattened head 410 against the outer surface 422 of the outer work piece 424, compressing and flattening its concave inner face 418. When the weakened area 426 on mandrel 404 fractures and the shank 416 is released, the concave inner face 418 attempts to retain its original shape causing the rim 430 of the inner face 418 to apply a spring-like force to the outer surface 422. This force holds the work pieces (424 & 432) snugly between the head 410 and deformed portion of the rivet body's sleeve 406. As a result, the head 410 may increase application strength and prevent rotation of the rivet body 400 with or without a locking washer or serrated inner surface.

The head or flange of the rivet body 402, 502 & 602 may be part of a single piece rivet unit (e.g., enlarged flattened head 410) or it may be removable (e.g., removable heads 510 & 610). In FIG. 15, a rivet body 500 is depicted formed from a single tube 518 having a threaded portion 520 abutting the sleeve portion 506 and forming bolt head 508. Enlarged flattened head 510 includes a threaded aperture 522 so that it may be threaded onto threaded portion 520, and is thus removable. In exemplary embodiments, enlarged flattened head 510 may have a six-sided or hex design similar to a standard nut, or, may alternatively be cylindrical. Additionally, enlarged flattened head 510 may have serrated inner 524 (and outer) surfaces depending upon application requirements. These serrated surfaces 524 may function to increase surface friction between the rivet head 510 and the outer surface 526 of the work piece 528 to prevent rotation of bolt rivet assembly 500 eliminating the need for a lock washer (FIG. 14). The serrated surfaces 524 may further function to prevent rotation of the bolt rivet assembly 500 during loosening and/or tightening of a nut onto the bolt head 508. Alternately, as shown in FIG. 16, a lock washer 616 may be utilized in place of serrated surfaces for preventing rotation of the rivet assembly 600 and removal of the head 608. Lock washer 616 may encircle rivet sleeve 606 and be trapped between the enlarged flattened head and the upper surface 618 of a work piece 620.

In the embodiment shown in FIG. 16, weakened area 626 is positioned on mandrel 604 so that a length 628 of shank 616 remains in rivet body 602 after separation of the rear portion of the shank 616. Preferably, length 628 is predetermined to allow shank 616 to fracture at a point that is substantially flush with the end of bolt head 608. In this manner, the length 628 substantially fills the hollow portion of the rivet body 602, increasing its strength.

FIGS. 1 through 16 illustrate augers designed to be rotated clockwise during insertion. However, it will be appreciated by those of skill in the art that the augers illustrated herein may alternately be designed to be rotated counterclockwise during insertion without departing from the scope and spirit of the present invention. Similarly, in FIGS. 14 though 16, bolt heads are shown having clockwise threads. However, bolt heads in accordance with the present invention may also be reverse threaded (i.e., may have counterclockwise threads).

It is believed that the self-polishing and tapping rivet assembly of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A rivet assembly, comprising:
    a rivet body having a hollow tubular sleeve and an enlarged flattened head suitable for abutting the surface of a work piece; and
    a mandrel disposed in said rivet body, the mandrel including an auger having a tip portion, a shoulder portion and a groove being formed therein so as to extend longitudinally through the auger from the tip through the shoulder;
    a cutting portion including at least one cutting edge formed by the groove for incrementally shaving material from the work piece for forming an aperture in the work piece as said mandrel is rotated, and a polishing portion including at least one cylindrical polishing edge formed by the groove for deburring and polishing the aperture created by said at least one cutting edge,
    wherein the aperture formed by the cutting portion and polishing portion receives the hollow tubular sleeve when the rivet body is inserted in the work piece.

2. The rivet assembly as claimed in claim 1, wherein the at least one cutting edge comprises a leading cutting edge and a trailing cutting edge formed on opposite sides of the groove.

3. The rivet assembly as claimed in claim 2, wherein the leading cutting edge extends outwardly from a longitudinal axis of the auger further than the trailing cutting edge.

4. The rivet assembly as claimed in claim 1, wherein the at least one cutting edge is parallel to a longitudinal axis of the auger.

5. The rivet assembly as claimed in claim 1, wherein the at least one cutting edge forms an angle with respect a longitudinal axis of the auger.

6. The rivet assembly as claimed in claim 1, wherein the at least one cutting edge is curved.

7. The rivet assembly as claimed in claim 1, wherein the at least one polishing edge comprises a leading polishing edge and a trailing polishing edge formed on opposite sides of the groove.

8. The rivet assembly as claimed in claim 7, wherein the leading polishing edge extends outwardly from a longitudinal axis of the auger further than the trailing polishing edge.

9. The rivet assembly as claimed in claim 1, wherein the at least one polishing edge is parallel to a longitudinal axis of the auger.

10. The rivet assembly as claimed in claim 1, wherein the at least one polishing edge forms an angle with respect a longitudinal axis of the auger.

11. The rivet assembly as claimed in claim 1, wherein the at least one polishing edge is curved.

12. The rivet assembly as claimed in claim 1, wherein the auger comprises a tip being suitable for self-tapping the aperture.

13. The rivet assembly as claimed in claim 12, wherein the tip includes a point suitable for piercing the work piece, the point extending into an initial contact edge for removing work piece material.

14. The rivet assembly as claimed in claim 13, wherein the point and initial contact edge tap an aperture in the work piece by puncturing and separating the work piece and then scraping material from the work piece for pulling the auger through the work piece so that the auger is self-tapping.

15. The rivet assembly as claimed in claim 1, wherein the auger further comprises a thread for pulling the auger through the work piece.

16. The rivet assembly as claimed in claim 15, wherein the thread separates the at least one cutting edge into a plurality of cutting edges helically staged along the groove for pulling the auger through the work piece.

17. The rivet assembly as claimed in claim 15, wherein the auger includes a tapered polishing portion having at least one polishing edge, and wherein the thread blends into the polishing portion.

18. The rivet assembly as claimed in claim 1, further comprising a threaded bolt head extending from the enlarged flattened head opposite the hollow tubular sleeve.

19. The rivet assembly as claimed in claim 1, wherein the shoulder section having an outer diameter greater than the inner diameter of the hollow tubular sleeve, the shoulder section being suitable for radially compressing and spreading the hollow tubular sleeve as said mandrel is retracted, and a shank having an area of reduced diameter spaced rearward from the shoulder section and sized for allowing the auger and shoulder section to be detached upon application of predetermined tensile force to the shank.

20. The rivet assembly as claimed in claim 19, further comprising a threaded bolt head extending from the enlarged flattened head opposite the hollow tubular sleeve, wherein the area of reduced diameter is positioned substantially flush with an end of the bolt head after the auger and shoulder section are detached so that a length of the shank remains in the rivet body.

21. The rivet assembly as claimed in claim 1, wherein the auger has a length (l), the at least one cutting edge forms an angle ($\alpha$) with respect to the longitudinal axis of the auger and the at least one polishing edge forms an angle ($\beta$) with respect to the longitudinal axis of the auger, the values of angle ($\alpha$) and angle ($\beta$) being selected for the material properties of the work piece.

22. The rivet assembly as claimed in claim 1, wherein at least one cutting edge comprises a plurality of cutting edges helically staged along the groove for pulling the auger through the work piece.

23. A rivet assembly, comprising:
    a rivet body having a hollow tubular sleeve and an enlarged flattened head suitable for abutting the surface of a work piece; and
    a mandrel disposed in said rivet body, the mandrel including an auger having a groove generally longitudinally disposed therein forming at least one cutting edge and at least one polishing edge, the auger further comprising a tip and shoulder portion, the groove being formed so that it extends longitudinally through the auger from the tip through the shoulder portion and, the polishing edge formed in a cilindrical portion of the auger;
    wherein the at least one cutting edge is suitable for incrementally shaving material from the work piece as said mandrel is rotated for creating an aperture capable of receiving the hollow tubular sleeve, and the at least one polishing edge is suitable for deburring polishing the aperture created by said at least one cutting edge.

24. The rivet assembly as claimed in claim 23, wherein the at least one cutting edge comprises a leading cutting edge and a trailing cutting edge formed on opposite sides of the groove.

25. The rivet assembly as claimed in claim 23, wherein the leading cutting edge extends outwardly from a longitudinal axis of the auger further than the trailing cutting edge.

26. The rivet assembly as claimed in claim 23, wherein the at least one cutting edge is parallel to a longitudinal axis of the auger.

27. The rivet assembly as claimed in claim 23, wherein the at least one cutting edge forms an angle with respect to a longitudinal axis of the auger.

28. The rivet assembly as claimed in claim 23, wherein the at least one cutting edge is curved.

29. The rivet assembly as claimed in claim 23, wherein the at least one polishing edge comprises a leading polishing edge and a trailing polishing edge formed on opposite sides of the groove.

30. The rivet assembly as claimed in claim 29, wherein the leading polishing edge extends outwardly from a longitudinal axis of the auger further than the trailing polishing edge.

31. The rivet assembly as claimed in claim 23, wherein the at least one polishing edge is parallel to a longitudinal axis of the auger.

32. The rivet assembly as claimed in claim 23, wherein the at least one polishing edge forms an angle with respect a longitudinal axis of the auger.

33. The rivet assembly as claimed in claim 32, wherein the at least one polishing edge is curved.

34. The rivet assembly as claimed in claim 23, wherein the auger comprises a tip suitable for self-tapping the aperture.

35. The river assembly as claimed in claim 34, wherein the tip includes a point suitable for piercing the work piece, the point extending into an initial contact edge for removing work piece material.

36. The rivet assembly as claimed in claim 23, wherein the auger further comprises a thread for pulling the auger through the work piece.

37. The rivet assembly as claimed in claim 23, further comprising a threaded bolt head extending from the enlarged flattened head opposite the hollow tubular sleeve.

38. The rivet assembly as claimed in claim 23, wherein the shoulder section having an outer diameter greater than the inner diameter of the hollow tubular sleeve, the shoulder section being suitable for radially compressing and spreading the hollow tubular sleeve as said mandrel is retracted, and a shank having an area of reduced diameter spaced rearward from the shoulder section and sized for allowing the auger and shoulder section to be detached upon application of predetermined tensile force to the shank.

* * * * *